Inventors
Elden W. West
Ernest R. Blome

Patented Aug. 10, 1937

2,089,516

UNITED STATES PATENT OFFICE 2,089,516

HAY LOADER

Elden W. West and Ernest R. Blome, Sidney, Nebr.

Application February 5, 1936, Serial No. 62,528

12 Claims. (Cl. 214—83)

Our invention relates generally to means for picking up hay from the ground and lifting and depositing the same on an elevated place, and particularly to a hay loader of mobile character, and an important object of the invention is to provide a mobile hay loader which efficiently picks up the hay from the ground, elevates the same, and deposits the same on a platform while the loader is in motion over the ground.

Another important object of the invention is to provide hay loading means of the character indicated which does not crush or otherwise mishandle the hay.

Another important object of the invention is to provide a hay loader of the character indicated which has elevator raddles which move in substantially perpendicular planes instead of in inclined planes which has heretofore been the practice, whereby the hay is picked up, and elevated with greater efficiency and with less damage to the hay.

Another important object of the invention is provide a hay loading attachment for a vehicle, such as a hay rack, which is mounted at the rear of the vehicle and carried thereby and is operated by one of the ground engaging wheels of the rack.

Another important object of the invention is to provide in hay loading means of the character indicated above a ground engaging member which is very easily brought into and out of ground engaging position by a person standing on the hay rack or the like to which the device is attached or mounted.

Other important objects and advantages of the invention will be apparent from a reading of the following description in connection with the drawings, wherein for purposes of illustration we have shown a preferred embodiment of our invention.

In the drawings:—

Figure 1:
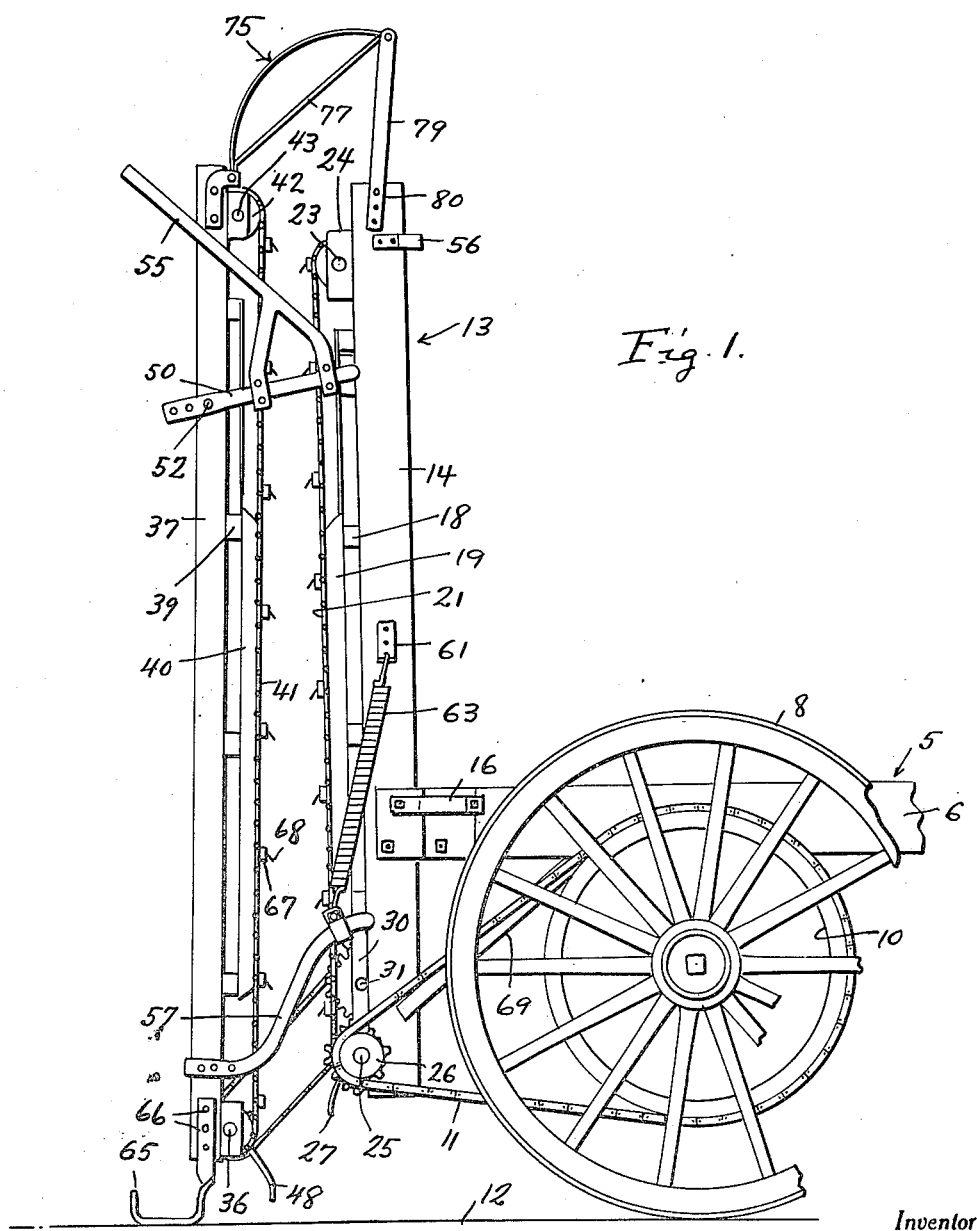
Figure 1 is a general elevational view of the right hand side of the embodiment.

Referring in detail to the drawings, the numeral 5 generally designates a mobile hay rack or the like which includes the side rails 6 and 7 suitably supported on ground engaging wheels 8 and 9. The ground engaging wheel 8 has thereon a sprocket annulus 10 over which is trained the sprocket chain 11 whereby motion over the ground 12 of the rack will produce motion of the sprocket chain 11 for driving the hay loader per se which is generally designated 13 and which comprises two front posts 14, 15 which are transversely spaced and are rigidly but removably attached to the rear ends of the side rails 6 and 7 of the rack by a suitable bracket means such as that generally designated 16 and 17 so as to be supported in a perpendicular position.

The rear edges of the posts 14 and 15 have vertically spaced transverse cleats 18 thereon which have suitable raddle belt chain guides 19 fastened to their rear edges and against which slides the rear flight 20 of the front raddle belt 21 which is trained over sprockets 22 spaced on a shaft 23 supported in bearings 24 at the upper end and at the rear side of the posts 14 and 15. The front flight of the raddle belt 21 passes between the posts 14 and 15 in front of the cleats 18. The lower end of the raddle 21 is trained over accommodating sprockets on the shaft 25 which is mounted in suitable bearings at the rear side and at the lower end of the posts 14 and 15. The right hand outer end of the shaft 25 has thereon a drive sprocket 26 over which the sprocket chain 11, operatively connected with the ground engaging wheel 8 of the rack, is trained. Feeder arms 27 are arranged along the shaft 25 between the raddle belt sprocket chain accommodating sprockets and these arms are bent so as to lean away from the direction of rotation of the shaft 25, the arms 27 being so arranged as to move through the raddle belt between adjacent ones of the raddles 28 as the device operates.

Each of the raddles 28 is in the form of a transverse member connected to and between the respective raddle sprocket chains of the belt 21 and these have pins 29 spaced therealong and leaning away from the direction of movement of the belt.

Figure 3:
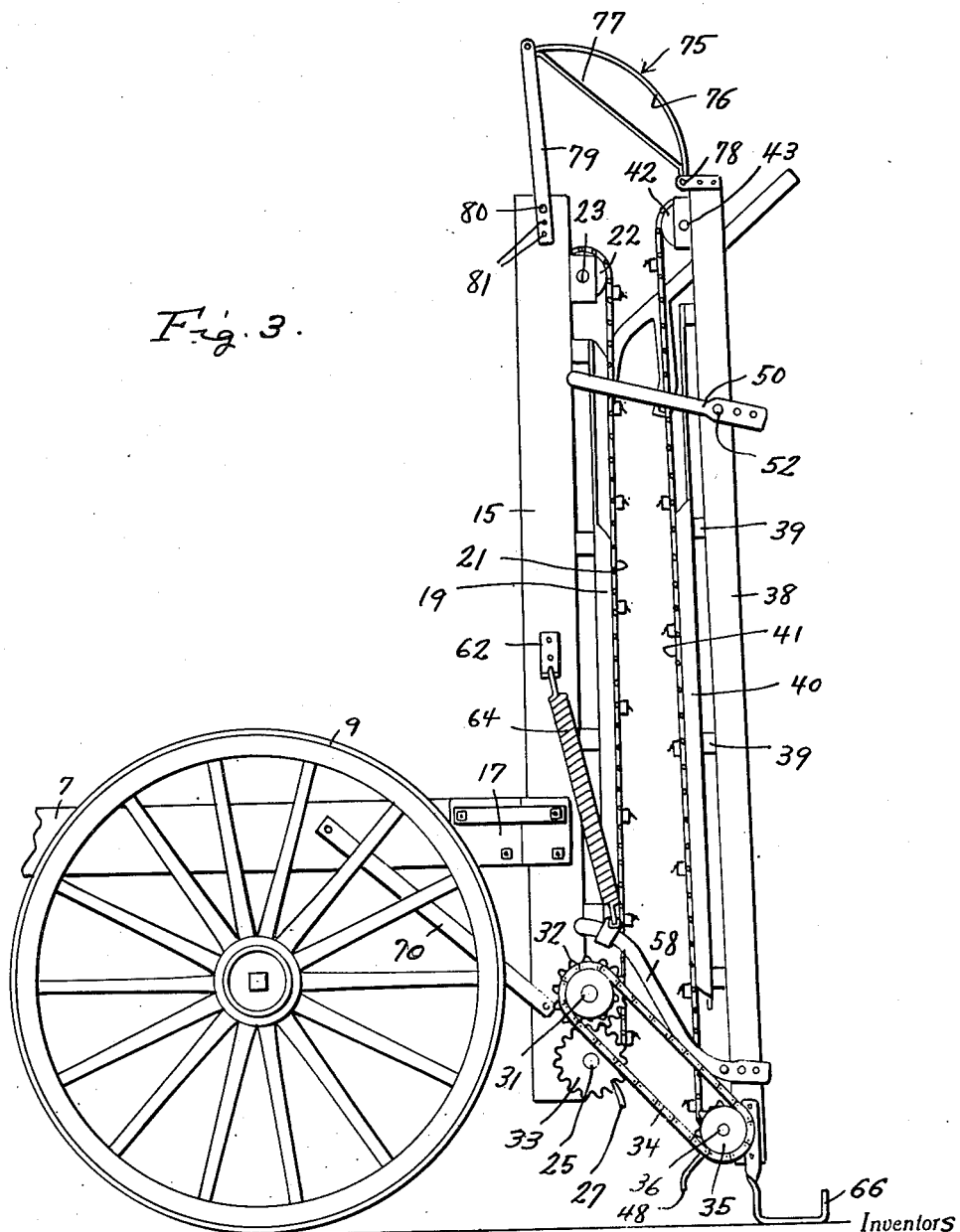
Figure 3 is an elevational view of the left hand side of the embodiment.

Journaled in the bearing 30 in which the shaft 25 is journaled is the shaft 31 which has on its left hand end the combination sprocket and gear 32 which is in mesh with the gear 33 on the left hand end of the shaft 25 and is engaged with the sprocket chain 34 which is trained over the sprocket wheel 35 on the shaft 36 at the lower end of the vertically adjustable section of the loader, as clearly shown in Figure 3.

The vertically adjustable section of the loader comprises the two rear posts 37 and 38 which in their operative position shown in Figure 3, are spaced and connected by means of the cleats 39 attached to their front edges, the cleats having attached to the front edges thereof in turn the guides 40 for the front flight of the raddle belt 41 which has its upper end trained over sprockets 42 properly spaced on the shaft 43 which is journaled in bearings 44 attached to the front edge of the upper part of the respective posts 37 and 38, while the lower end of the raddle belt 41 is trained over the sprockets 45 which are properly spaced on the shaft 36 which is mounted in the bearing 47 which is attached to the front side of the lower end of the respective posts 37 and 38.

Figure 4:
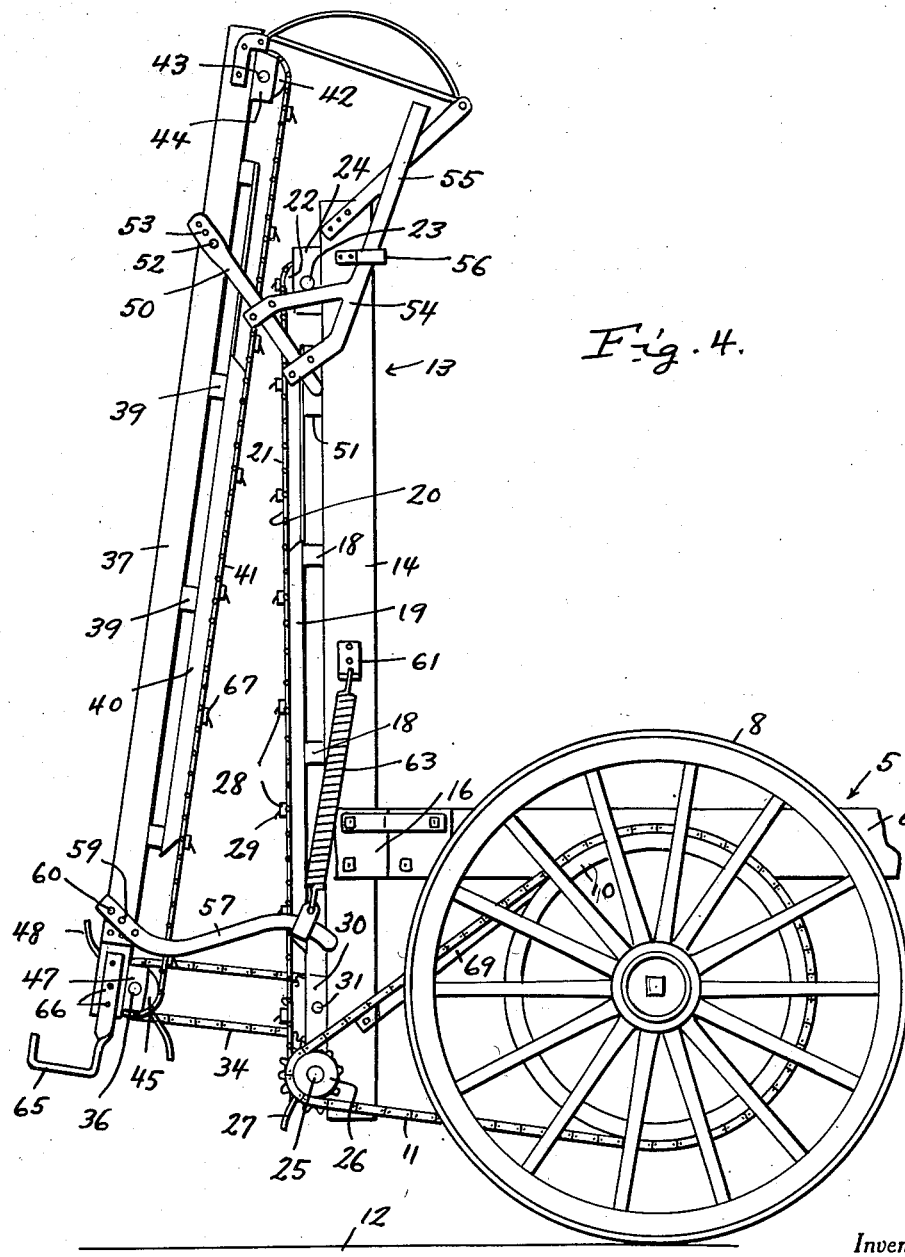
Figure 4 is an elevational view of the right hand side of the embodiment showing the ground engaging member elevated out of contact with the ground and in an inoperative position.

The shaft 36 has therealong the diametrically opposed and curved hay picking and lifting fingers 48 which are curved in the clockwise direction as shown in Figure 4 so as to gather and pick up and elevate the hay into a position between the raddle belts 20 and 41 as the vehicle is moved forwardly over the ground.

The vertically adjustable section of the device is supported on the stationary section by means of the U-shaped bar which is generally designated 50 and whose bight portion is journaled in the bearing 51 near the top of the posts 14 and 15 and below the bearing 24. The arms of the bracket 50 are pivotally attached as indicated by the numeral 52 to the respective posts 37 and 38, extra holes 53 being provided in the arms for adjustment purposes. On one arm of the bracket 50 is attached the Y-shaped lever 54 which has the handle portion 55 arranged to be received in the L-shaped rest 56 when the vertically adjustable section of the device is in its elevated inoperative position, as shown in Figure 4.

Double curved arms 57 and 58 have their rear ends attached as indicated by the numeral 59 to the lower part of the respective posts 37 and 38 of the vertically adjustable section of the device and the bight portion between their front ends is journaled in the posts 14 and 15 of the stationary section of the device. A plurality of holes 60 is provided in the attached end of the arms 57 and 58 for adjustment purposes.

Stretched between the rear ends of the arms 57 and 58 and the brackets 61 and 62 which are attached to the outer sides of the stationary posts 14 and 15 are compensating springs 63 and 64 which act to overbalance the adjustable section in either its inoperative or its operative position, whereby the adjustable section is maintained in a stabilized condition in either position, without being rigidly so maintained.

Fastened to the lower end of the posts 37 and 38 of the adjustable section of the device are the feet 65 and 66 which are arranged to engage and slide and rest upon the ground 12 while the adjustable section is in the operative position. A plurality of bolt holes 66 in each of the feet 65 and 66 provide for vertical adjustment thereof so as to exactly predetermine the relation of the hay engaging teeth 48 with the ground.

The raddle belt 41 is like the raddle belt 21 provided with raddles 67 equipped with short pins or teeth 68.

Diagonal brace bars 69 and 70 extend between and are connected to the side rails 6 and 7 of the hay rack and the corresponding stationary posts 14 and 15 to steady the mounting of the posts on the said side rails.

Suitable clutch means generally designated 71 on the shaft 31 is provided (to be operated by any suitable control means), whereby the combined sprocket wheel and gear 32 may be operatively connected and disconnected from the element 72 which is splined to the shaft 31, whereby the raddle belt 41 may be stopped or operated at will by the attendant on the hay rack.

Figure 2:
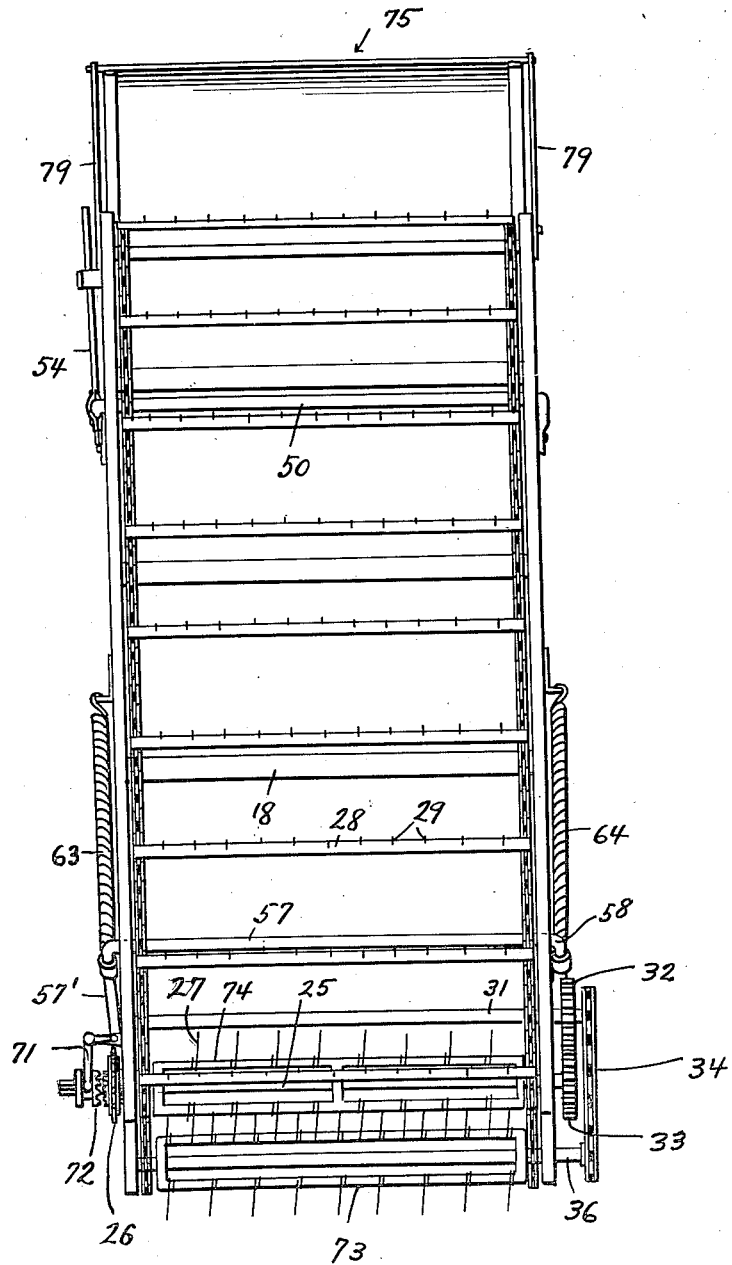
Figure 2 is a front elevational view of the loader showing the same detached from the mobile hay rack.

The mounting of the arms 48 on the shaft 36 by means of the frames 73 is clearly shown in Figure 2. Similarly the mounting of the fingers 27 on the shaft 25 by means of the frame 74 is clearly shown in Figure 2.

With the vertically adjustable section of the device in operative position as shown in Figure 3, the feet 65 and 66 ride along the ground in such a way as to procure proper engagement of the fingers 48 with the hay as the vehicle moves over the ground, so that the hay will be gently but surely fed into a position between the raddle belts and be by the raddles and teeth on the raddles elevated between the raddles until the hay reaches the upper extremity of the raddle belts, where, because of the greater height to which the raddle belt 41 reaches, the hay will be pushed on that side so as to be turned over as it reaches the hood 75 which has the curved portion 76 and the brace 77 and has its rear edge hingedly mounted as indicated by the numeral 78 on the upper end of the respective rear posts 37 and 38, and has its front end supported by the arms 79 pivotally connected as indicated by the numeral 80 to the outer side of the upper ends of the stationary posts 14 and 15, a number of bolt receiving holes 81 being provided in the arms 79 to enable vertical adjustment of the hood. The elevated hay coming into the hood 75 is directed forwardly over onto the hay rack.

When it is desired to elevate the adjustable section out of operative position the handle portion 55 of the lever 54 is grasped by the operator standing on the hay rack and pulled forwardly from the position shown in Figure 1 to the position shown in Figure 4.

Although we have shown and described herein a preferred embodiment of our invention, it is to be definitely understood that we do not desire to limit the application of the invention thereto, and any change or changes may be made in the materials, and in the structure and arrangement of the parts, within the spirit of the invention and the scope of the subjoined claims.

What is claimed is:—

1. A hay loader comprising a stationary section adapted for mounting on the rear of a hay rack in vertical position, a vertically adjustable section swingably supported on said stationary section, a first raddle equipped belt operatively mounted on said stationary section, a second raddle equipped belt operatively mounted on said vertically adjustable section, said adjustable section comprising ground engaging means, rotary hay picking and lifting means on said adjustable section and arranged to engage and elevate hay on the ground to a position between said belts, and driving means for driving said belts and said hay engaging and lifting means.

2. A hay loader comprising a stationary section adapted for mounting in vertical position on the rear of a hay rack, a vertically adjustable section swingably supported on said stationary section, a first raddle equipped belt operatively mounted on said stationary section, a second raddle equipped belt operatively mounted on said vertically adjustable section, said adjustable section comprising ground engaging means, hay picking and lifting means on said adjustable section and arranged to engage and elevate hay on the ground to a position between said belts, and driving means for driving said belts and said hay engaging and lifting means, said belts operating in substantially parallel perpendicular planes.

3. A hay loader comprising a stationary section adapted for mounting in vertical position on the rear of a hay rack, a vertically adjustable section swingably supported on said stationary section, a first raddle equipped belt operatively mounted on said stationary section, a second raddle equipped belt operatively mounted on said vertically adjustable section, said adjustable section comprising ground engaging means, hay picking and lifting means on said adjustable section and arranged to engage and elevate hay on the ground to a position between said belts, and driving means for driving said belts and said hay engaging and lifting means, and spring actuated overbalancing means keeping said adjustable section overbalanced into either its depressed operative position or its vertically adjusted elevated inoperative position.

4. A hay loader comprising a stationary section adapted for mounting on the rear of a hay rack, a vertically adjustable section swingably supported on said stationary section, a first raddle equipped belt operatively mounted on said stationary section, a second raddle equipped belt operatively mounted on said vertically adjustable section, said adjustable section comprising ground engaging means, hay picking and lifting means arranged to engage and elevate hay on the ground to a position between said belts, and driving means for driving said belts and said hay engaging and lifting means, and pivoted arm means swingably and supportably connecting said adjustable section on said stationary section, and a manual lever on said arm means enabling moving said arm means to bring said adjustable section into and out of operative position.

5. A hay loader comprising a stationary section adapted for mounting on the rear of a hay rack, a vertically adjustable section swingably supported on said stationary section, a first raddle equipped belt operatively mounted on said stationary section, a second raddle equipped belt operatively mounted on said vertically adjustable section, said adjustable section comprising ground engaging means, hay picking and lifting means arranged to engage and elevate hay on the ground to a position between said belts, and driving means for driving said belts and said hay engaging and lifting means, and a hood on the upper end of said sections for deflecting the elevated hay in front of said stationary section, said hood having a pivotal connection with said adjustable section and having also a link connection with said stationary section.

6. A hay loader comprising a stationary section adapted for mounting on the rear of a hay rack, a vertically adjustable section swingably supported on said stationary section, a first raddle equipped belt operatively mounted on said stationary section, a second raddle equipped belt operatively mounted on said vertically adjustable section, said adjustable section comprising ground engaging means, hay picking and lifting means journalled in said vertically adjustable section and arranged to engage and elevate hay on the ground to a position between said belts, and driving means for driving said belts and said hay engaging and lifting means, in combination with a wheeled hay rack, said stationary section being rigidly mounted in the rear end of said hay rack, a wheel on said hay rack comprising a sprocket, and a sprocket chain trained thereover and operatively connected to said driving means.

7. A hay loader comprising a stationary section adapted for mounting on the rear of a hay rack, a vertically adjustable section swingably supported on said stationary section, a first raddle equipped belt operatively mounted on said stationary section, a second raddle equipped belt operatively mounted on said vertically adjustable section, said adjustable section comprising ground engaging means, hay picking and lifting means journalled in said vertically adjustable section and arranged to engage and elevate hay on the ground to a position between said belts, and driving means for driving said belts and said hay engaging and lifting means, said driving means including a sprocket chain driven shaft, and a second shaft geared thereto, the corresponding raddle equipped belt being operatively connected to said driven shaft.

8. A hay loader comprising a stationary section adapted for mounting on the rear of a hay rack, a vertically adjustable section swingably supported on said stationary section, a first raddle equipped belt operatively mounted on said stationary section, a second raddle equipped belt operatively mounted on said vertically adjustable section, said adjustable section comprising ground engaging means, hay picking and lifting means journalled in said vertically adjustable section and arranged to engage and elevate hay on the ground to a position between said belts, and driving means for driving said belts and said hay engaging and lifting means in combination with a mobile hay rack containing said driving means.

9. A hay loader comprising a stationary section adapted for mounting in vertical position on the rear of a hay rack with the lower extremity thereof spaced above the ground, a vertically adjustable section secured to and in the rear of said stationary section to be in substantial parallelism with said stationary section when said hay loader is in operative position, said two sections being spaced apart to provide a substantially vertical chute therebetween, a raddle equipped belt operatively mounted on said vertically adjustable section, a rotary pick-up device at the lower extremity of said vertically adjustable section, and a foot depending from said vertically adjustable section to function as a support therefor and as a spacer to prevent said pick-up device from being forced into the soil.

10. A hay loader comprising a stationary section adapted for mounting on the rear of a hay rack with the lower extremity thereof spaced above the ground, a vertically adjustable section swingably connected to said stationary section, a first endless belt on said stationary section, a second endless belt on said vertically adjustable section, a picking and lifting means on said vertically adjustable section at the lower extremity thereof, a foot for supporting said vertically adjustable section on the ground and for spacing said hay picking and lifting means from the ground, and manually operable means for elevating said vertically adjustable section and said hay picking and lifting means and said foot into inoperative position.

11. A hay loader comprising a stationary section adapted for mounting in vertical position on the rear of a hayrack with the lower extremity thereof spaced above the ground, a vertically adjustable section secured to and in the rear of said stationary section to be in substantial parallelism with said stationary section when said hay loader is in operative position, said two sections being spaced apart to provide a substantially vertical chute therebetween, a raddle-equipped belt operatively mounted on said vertically adjustable section, a transverse shaft in the lower extremity of said vertically adjustable section for driving said raddle-equipped belt, and a pick-up device secured to said transverse shaft to be rotated thereby for picking up and elevating the hay into the path of said raddle-equipped belt.

12. A hay loader including a stationary section adapted to be removably secured in vertical position to the rear end of a mobile hayrack, a vertically adjustable section secured to and in the rear of said stationary section, said two sections being spaced apart and in substantial parallelism to provide a substantially vertical chute therebetween, transverse shafts at the upper and lower extremities of said vertically adjustable section, an endless belt conveyor passing over said two shafts with the inner run thereof traveling upwardly for elevating the hay in the chute between said two sections, a rotary pick-up on the lower of said two transverse shafts, said pick-up being adapted to lift the hay from the surface of the ground and into the path of said belt conveyor, a foot at the lower extremity of said vertically adjustable section for spacing the rotary pick-up from the surface of the ground, and manually operable means for elevating said vertically adjustable section and said pick-up and said foot into inoperative position.

ELDEN W. WEST.
ERNEST R. BLOME.